(12) United States Patent
Takaki et al.

(10) Patent No.: US 9,842,103 B1
(45) Date of Patent: *Dec. 12, 2017

(54) MACHINED BOOK DETECTION

(71) Applicant: Amazon Technologies, Inc., Seattle, WA (US)

(72) Inventors: Mitsuo Takaki, Bellevue, WA (US); Divya Mahalingam, Seattle, WA (US); David Gordon Leatham, Kirkland, WA (US); David Rezazadeh Azari, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,488

(22) Filed: Apr. 11, 2016

Related U.S. Application Data

(63) Continuation of application No. 13/720,195, filed on Dec. 19, 2012, now Pat. No. 9,372,850.

(51) Int. Cl.
| | | |
|---|---|---|
| *G06F 17/27* | (2006.01) | |
| *G06F 17/28* | (2006.01) | |
| *G06F 17/20* | (2006.01) | |
| *G10L 15/00* | (2013.01) | |
| *G10L 25/00* | (2013.01) | |

(52) U.S. Cl.
CPC .......... *G06F 17/278* (2013.01); *G06F 17/274* (2013.01); *G06F 17/28* (2013.01)

(58) Field of Classification Search
CPC .... G06F 17/2785; G06F 17/277; G06F 17/27; G06F 17/2735; G06F 17/2705; G06F 17/271; G06F 17/274; G06F 17/2881; G06F 17/273; G06F 17/2755; G06F 17/279; G06F 17/30386; G06F 17/30705; G06F 17/21; G06F 17/2775; G06F 17/30011; G10L 15/1822; G10L 2015/088
USPC .................. 704/9, 3, 5, 8, 10, 277, 275, 251
See application file for complete search history.

(56) References Cited

U.S. PATENT DOCUMENTS

| | | | | |
|---|---|---|---|---|
| 5,799,268 | A * | 8/1998 | Boguraev | ........... G06F 17/2775 704/10 |
| 5,963,965 | A * | 10/1999 | Vogel | ................ G06F 17/30696 707/999.003 |
| 6,157,905 | A * | 12/2000 | Powell | ................ G06F 17/2217 704/2 |
| 6,212,494 | B1 * | 4/2001 | Boguraev | ........... G06F 17/2775 704/10 |
| 6,507,829 | B1 * | 1/2003 | Richards | ............. G06F 17/2715 704/9 |

(Continued)

*Primary Examiner* — Edgar Guerra-Erazo
(74) *Attorney, Agent, or Firm* — Pierce Atwood LLP

(57) ABSTRACT

A system and method for determining whether a textual work submitted for publishing is machine generated or non-machine generated by identifying and quantifying various aspects of the textual work and comparing those aspects to known works. For example, the system and method may identify aspects of a textual work, including, a relationship between the sentences within the textual work, a writing style of the author of the textual work, a grammatical structure of the sentences within the textual work, a quality of the textual work, and other aspects of the textual work. Upon determining that the textual work is machine generated the textual work may be rejected for publishing.

18 Claims, 11 Drawing Sheets

(56) References Cited

U.S. PATENT DOCUMENTS

| | | | | |
|---|---|---|---|---|
| 6,778,952 B2* | 8/2004 | Bellegarda | G06F 17/2715 | 704/1 |
| 6,934,675 B2* | 8/2005 | Glinski | G06F 17/30666 | 704/10 |
| 7,139,752 B2* | 11/2006 | Broder | G06F 17/30616 | |
| 7,555,427 B2* | 6/2009 | Kirshenbaum | G06F 17/2785 | 704/10 |
| 7,620,538 B2* | 11/2009 | Marcu | G06F 17/2735 | 704/10 |
| 7,720,675 B2* | 5/2010 | Burstein | G06F 17/274 | 704/1 |
| 8,166,045 B1* | 4/2012 | Mazumdar | G06F 17/30864 | 707/713 |
| 8,402,033 B1* | 3/2013 | Mazumdar | G06F 17/30616 | 707/713 |
| 9,355,169 B1* | 5/2016 | Mazumdar | G06F 17/30864 | |
| 2003/0055655 A1* | 3/2003 | Suominen | G10L 15/22 | 704/276 |
| 2003/0236659 A1* | 12/2003 | Castellanos | G06F 17/271 | 704/4 |
| 2005/0049852 A1* | 3/2005 | Chao | G06F 17/2785 | 704/9 |
| 2006/0100852 A1* | 5/2006 | Gamon | G06F 17/271 | 704/9 |
| 2006/0206306 A1* | 9/2006 | Cao | G06F 17/2775 | 704/4 |
| 2007/0143282 A1* | 6/2007 | Betz | G06F 17/30864 | |
| 2008/0103773 A1* | 5/2008 | Kirshenbaum | G06F 17/2785 | 704/252 |
| 2008/0243479 A1* | 10/2008 | Cafarella | G06F 17/30696 | 704/9 |
| 2008/0306949 A1* | 12/2008 | Hoernkvist | G06F 17/30622 | |
| 2009/0024555 A1* | 1/2009 | Rieck | G06F 7/02 | 706/54 |
| 2009/0043721 A1* | 2/2009 | Reznik | G06F 17/30887 | 706/20 |
| 2009/0063404 A1* | 3/2009 | Hacigumus | G06F 17/30625 | |
| 2009/0171662 A1* | 7/2009 | Huang | G10L 15/1822 | 704/251 |
| 2012/0072204 A1* | 3/2012 | Nasri | G06F 17/2229 | 704/9 |
| 2013/0138641 A1* | 5/2013 | Korolev | G06F 17/2785 | 707/730 |
| 2013/0268263 A1* | 10/2013 | Park | G06F 17/215 | 704/9 |
| 2013/0325442 A1* | 12/2013 | Dahlmeier | G06F 17/276 | 704/9 |

* cited by examiner

| Words      | This | is | a | sample | text | it | has | different | words |
|------------|------|----|----|--------|------|----|-----|-----------|-------|
| Sentence 1 | 1    | 1  | 1 | 1      | 1    | 0  | 0   | 0         | 0     |
| Sentence 2 | 0    | 0  | 0 | 0      | 0    | 1  | 1   | 1         | 1     |
| Sentence 3 | 0    | 0  | 0 | 0      | 0    | 0  | 0   | 1         | 2     |

FIG. 5

MACHINED BOOK DETECTION

CROSS-REFERENCE TO RELATED APPLICATION

This application is a continuation of, and claims the benefit of priority of, U.S. Non-provisional patent application Ser. No. 13/720,195, filed Dec. 19, 2012 and entitled "Machined Book Detection," the contents of which is expressly incorporated herein by reference in its entirety.

BACKGROUND

With the advancement of technology, computer generated content is becoming more prevalent. In general, computer generated content is created by a computer program or application that searches or crawls various websites accessible via the Internet for certain types of content, such as, news articles, weather forecasts, user reviews, and other types of content, and aggregates or combines the content from various sources. The computer generated content may then be posted on a website for users to view.

BRIEF DESCRIPTION OF DRAWINGS

For a more complete understanding of the present disclosure, reference is now made to the following description taken in conjunction with the accompanying drawings.

FIG. 5 illustrates an exemplary N-dimensional plot table according to one aspect of the present disclosure.

DETAILED DESCRIPTION

In some instances, less than scrupulous individuals may seek to repackage computer generated content and offer it for sale to unsuspecting consumers of electronically published content. Independent publishing companies, services, and/or websites can receive numerous submission every day and it can be difficult and time consuming for the publishers to sift through all of the submissions to determine which include legitimate, coherent content and which do not.

To address these concerns, the present disclosure offers a method and system to detect whether a textual work, such as a book, article, or other textual work is a legitimate, coherent work (for example, generated by a human) or not (for example, generated by machine, such as a computer). Machine generated works may then be isolated, and in one aspect, removed, from a publication catalog to avoid accidental purchase of such materials by consumers.

Typically, machine generated works are relatively unstructured collections of content compiled together by a computer process or application, or content that is not presented in a grammatically correct format. For example, a machine generated work may be a collection of user comments on websites, a collection of random words from a dictionary, machine translations, a compilation of news articles, and other collections or compilations of text. These machine generated works typically do not have a logical or meaningful flow or a coherent story line throughout the work. When such machine generated works are published and offered for sale, an unsuspecting user or purchaser of such a work may be disappointed, for example, due to the poor quality and nonsensical nature of the work.

The systems and methods disclosed herein can determine whether a textual work is machine generated or non-machine generated by identifying and quantifying various aspects of the textual work. For example, the system and method may identify aspects of a textual work, including, a relationship between the sentences within the textual work, a writing style of the author of the textual work, a grammatical structure of the sentences within the textual work, a quality of the textual work, and other aspects of the textual work.

Figure 1:
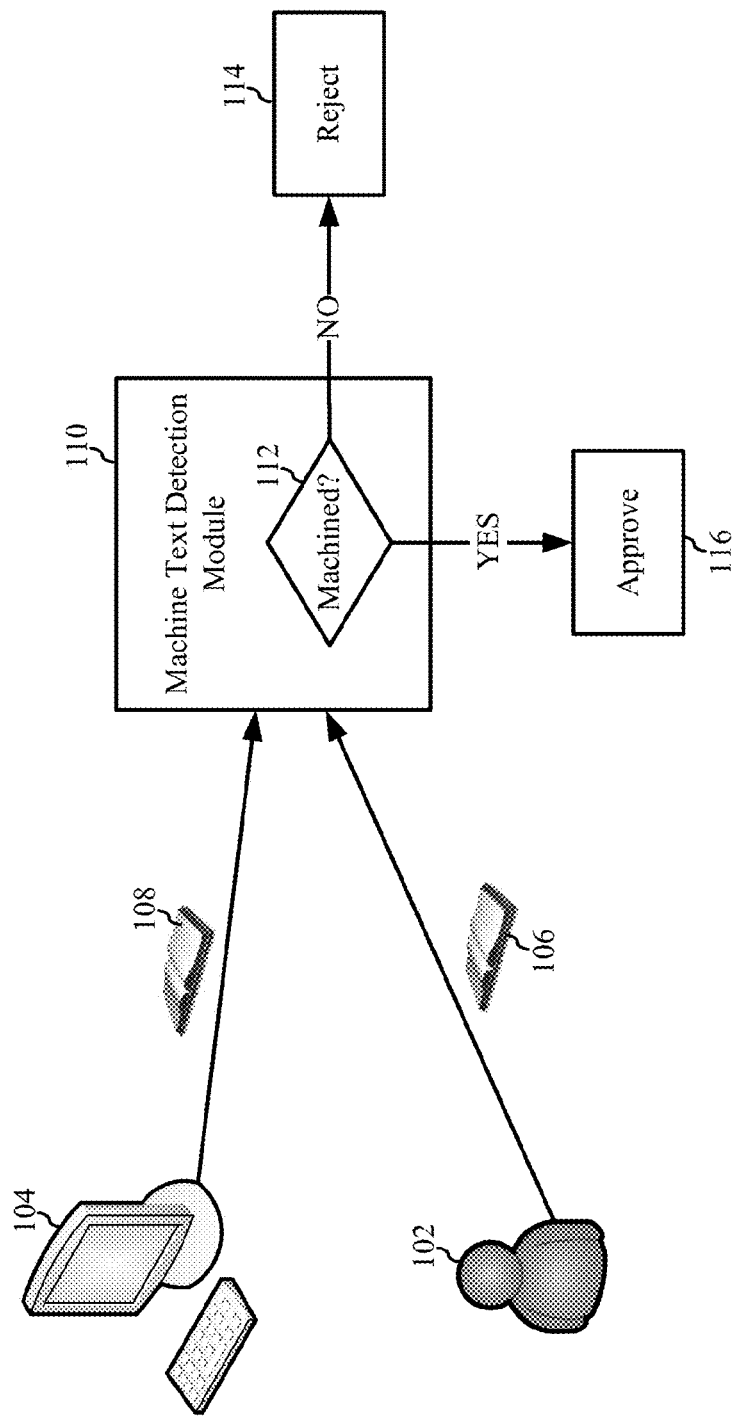
FIG. 1 illustrates a pictorial diagram of a method and system for detecting machine generated works according to one aspect of the present disclosure.

FIG. 1 illustrates an exemplary implementation of the system and method. A human 102 and a machine 104, for example, a computer, may create or generate respective textual works 106 and 108. The respective textual works 106 and 108 may be submitted for publishing, for example, to a publishing company, service, or website. An initial determination may be made as to whether each of the textual works 106 and 108 are legitimate, coherent works that should potentially proceed to publishing. This determination may be made by a machine text detection module or system 110 that analyzes the text of the textual works 106 and 108 and determines 112 whether the textual works 106 and 108 are machine generated. If the machine text detection module 110 determines that the textual work is machine generated, such as the textual work 108 generated by the machine 104, the textual work 108 may be rejected for publishing 114. On the other hand, if the machine text detection module 110 determines that the textual work is non-machine generated, such as the textual work 106 generated by the human 102, the textual work 106 may be approved for publishing 116. After the textual work 106 or 108 is approved or rejected, the textual work 106 or 108 may optionally be subjected to further manual review to determine whether or not the textual work 106 or 108 should actually published.

According to aspects of the present disclosure, the machine text detection module 110 parses the text of the textual work 106 and/or 108, for example, including N words, and generates a sequence of the N words of the textual work 106 and/or 108, for example, as an N-gram. Each extract or word of the N-gram is then plotted as a point in an N-dimensional space, where N is the number of words in the work. The points in the N-dimensional space are transformed to a 2-dimensional space, and a shape descriptor and a center of mass of the plot in the 2-dimensional space is calculated. The shape descriptor and the center of mass are compared to shape descriptors and centers of masses of known or sample machine generated and non-machine generated textual works for similarity to identify whether the textual work 106 and/or 108 has the qualities or aspects of a machine generated or a non-machine generated work.

Although the methods and systems are described as identifying machine generated works, the system and method may identify works that are unstructured and lack a logical flow. Thus, the systems and methods disclosed herein can be used to identify non-machine generated works that are unstructured and do not include a logical flow.

Aspects of the present disclosure may allow for independent publishers to analyze and filter textual works that are received to identify those works that should not be published, such as machine generated works. This can reduce the amount of textual works requiring manual or human review and reduce the possibility of an unstructured machine generated work being offered for sale to unsuspecting users or purchases.

Figure 2:
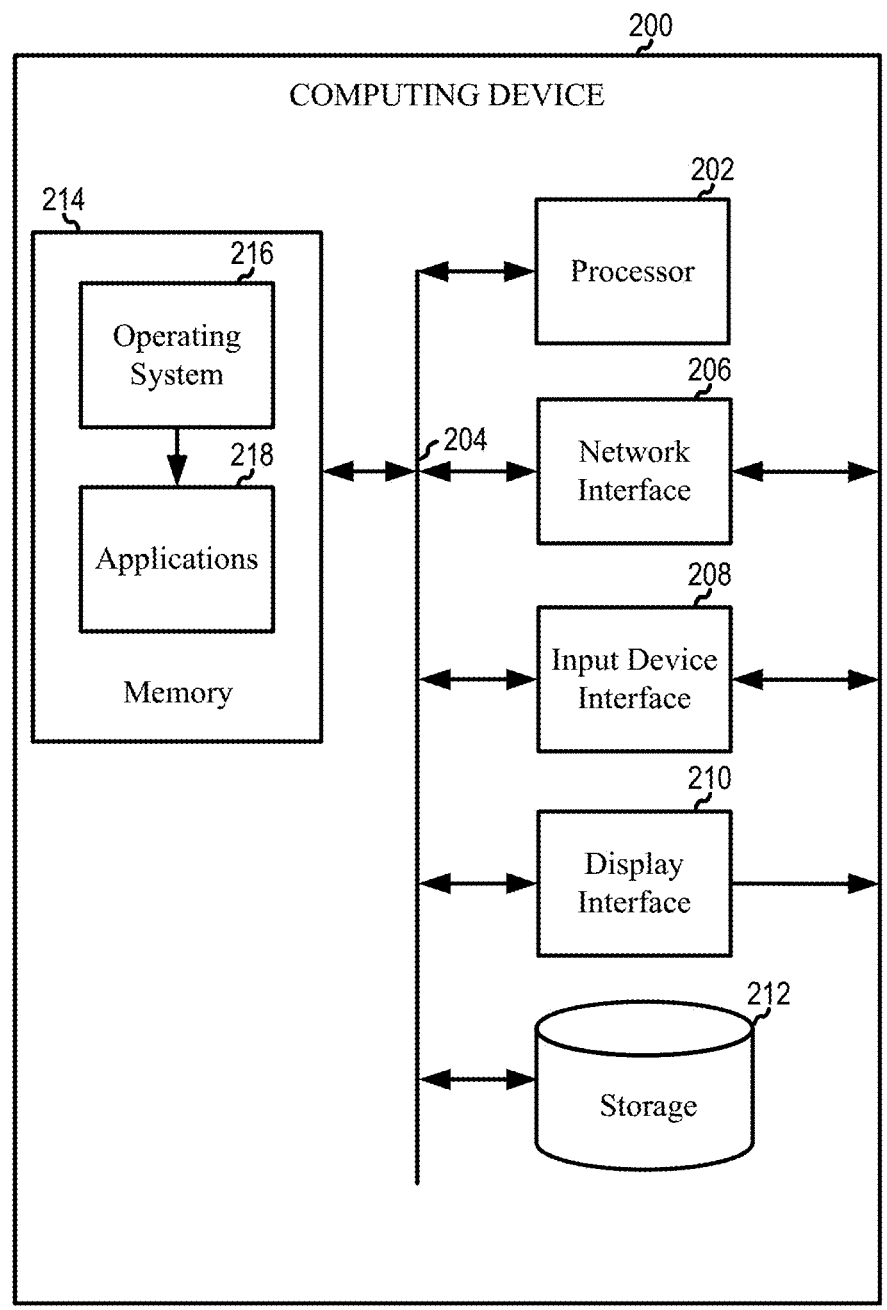
FIG. 2 is a block diagram conceptually illustrating a computing device according to one aspect of the present disclosure.

Aspects of the present disclosure may be implemented as a computer implemented method in a computing device or computer system. FIG. 2 illustrates an exemplary computing device 200. The computing device 200 may include a processor 202 in communication with a variety of other components over a system bus 204 or through a direct connection. These other components may include, for example, a network interface 206, an input device interface 208, a display interface 210, and a storage database 212. As appreciated by those skilled in the art, the network interface 206 enables the computing device 200 to communicate data, control signals, data requests, and other information with other resources including computers, data sources, storage devices, and the like, on a computer network such as the Internet. The network interface 206 may be configured to communicate via wired or wireless connections. As one skilled in the art should appreciate, the computing device 200 may obtain an electronic textual work from another computer, a storage device, or other source via the computer network, as well as save the textual work to a networked location or send it to another computer on the network.

The input device interface 208, sometimes also embodied as an input/output interface, enables the computing device 200 to obtain data input from a variety of devices including, but not limited to, a digital pen, a touch screen, a keyboard, a mouse, a scanner, and the like. In addition to the exemplary components described above, a display interface 210 may be used for outputting display information to a computer user. Typically, the display information is output by the display interface 210 via a display device (e.g., a monitor or similar device). While not illustrated, one skilled in the art should appreciate that a display device may be incorporated as an integral element within a computing device 200 or may be separate therefrom.

The processor 202 may be configured to operate in accordance with programming instructions stored in a memory 214. The memory 214 generally comprises RAM, ROM, and/or other memory. Thus, in addition to storage in read/write memory (RAM), programming instructions may also be embodied in read-only format, such as those found in ROM or other non-volatile memory. The memory 214 may store an operating system 216 for controlling the operation of the computing device 200. The operating system may be a general purpose operating system such as a Microsoft Windows operating system, a UNIX operating system, a Linux operating system, or an operating system specifically written for and tailored to the computing device 200. Similarly, the memory 214 may also store user-executable applications 218, or programs, for conducting various functions on the computing device 200. For example, the application 218 in memory 214 may be configured according to aspects of the present disclosure to process or analyze a textual work, and the textual work and/or the processed textual work may be stored in the storage database 212.

Figure 3:
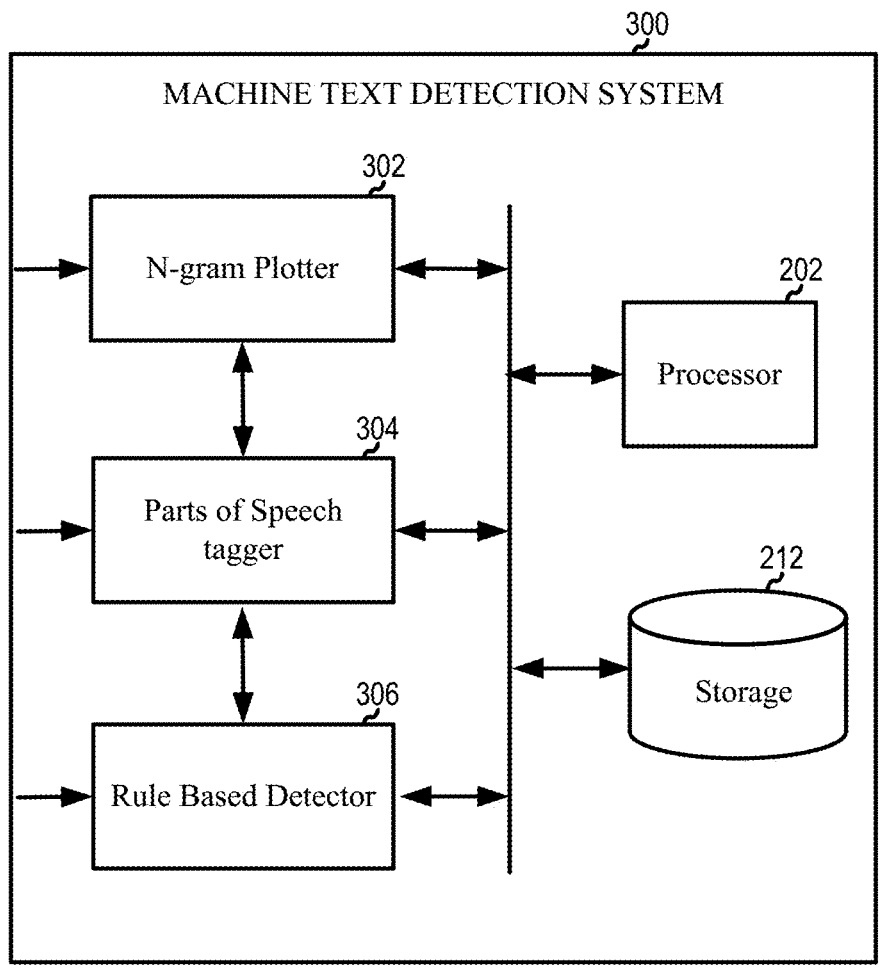
FIG. 3 is a block diagram conceptually illustrating a machine text detection system according to one aspect of the present disclosure.

A machine text detection system suitable for identifying aspects of a textual work may be implemented in an application or module implemented on the computing device 200, in a plurality of cooperating applications/modules on the computing device 200, or in a plurality of cooperating applications and/or modules distributed over multiple computing devices 200 in a computer network, for example. Components of the machine text detection system may be identified with regard to various logical components. FIG. 3 is a block diagram illustrating logical components of a machine text detection system 300 for identifying aspects of a textual work. As illustrated in FIG. 3, the machine text detection system 300 includes one or more N-gram plotters 302, one or more parts of speech taggers 304, and one or more rule based detectors 306. Further, for illustrative purposes, the machine text detection system 300 includes the processor 202 and storage database 212.

The machine text detection system 300 receives a textual work that was generated or created, for example, by a human or a machine. The N-gram plotter 302 parses or extracts N words of the textual work and generates a sequence of the N words as an N-gram. The N-gram may be a contiguous sequence of N words from the textual work. The N-gram plotter 302 plots each extract or word of the N-gram in an N-dimensional space. The points in the N-dimensional space are transformed to a 2-dimensional space, and a shape descriptor and a center of mass of the plot in the 2-dimensional space are calculated. The shape descriptor and the center of mass are used to identify whether the textual work has the qualities or aspects of a machine generated or a non-machine generated work.

The parts of speech tagger 304 parses the text of the textual work and identifies the words of the text, for example, verbs, nouns, pronouns, adjectives, adverbs, prepositions, conjunctions, interjections, etc. in one or more sentences of the textual work. The N-gram plotter 302 may utilize the results of the parts of speech tagger 304 and generate one or more sequences of certain types of words identified by the parts of speech tagger 304 as the N-grams. For example, the N-gram plotter 302 may generate an N-gram including the nouns of the textual work, the verbs of the textual work, the pronouns of the textual work, the adjectives of the textual work, the adverbs of the textual work, the prepositions of the textual work, the conjunctions of the textual work, the interjections of the textual work, and various combinations thereof. This may be desirable in order to remove certain common words from the analysis, for example, "the", "a", and other common words.

The rule based detector 306 may also utilize the results of the parts of speech tagger 304, for example, the verbs, nouns, pronouns, adjectives, adverbs, prepositions, conjunctions, interjections, etc. in each sentence of the textual work. The rule based detector 306 analyzes the sentences according to various grammatical rules and identifies, for example, improper verb clustering, improper verb tense, improper noun clustering, improper sentence endings, foreign word occurrences, and other grammatical errors and anomalies. The rule based detector 306 assigns a score relating to grammatical correctness for each sentence based on each rule, and computes an overall score for the textual work based on each rule. These scores are then used to determine whether the textual work is a machine generated or a non-machine generated work.

Figure 4:
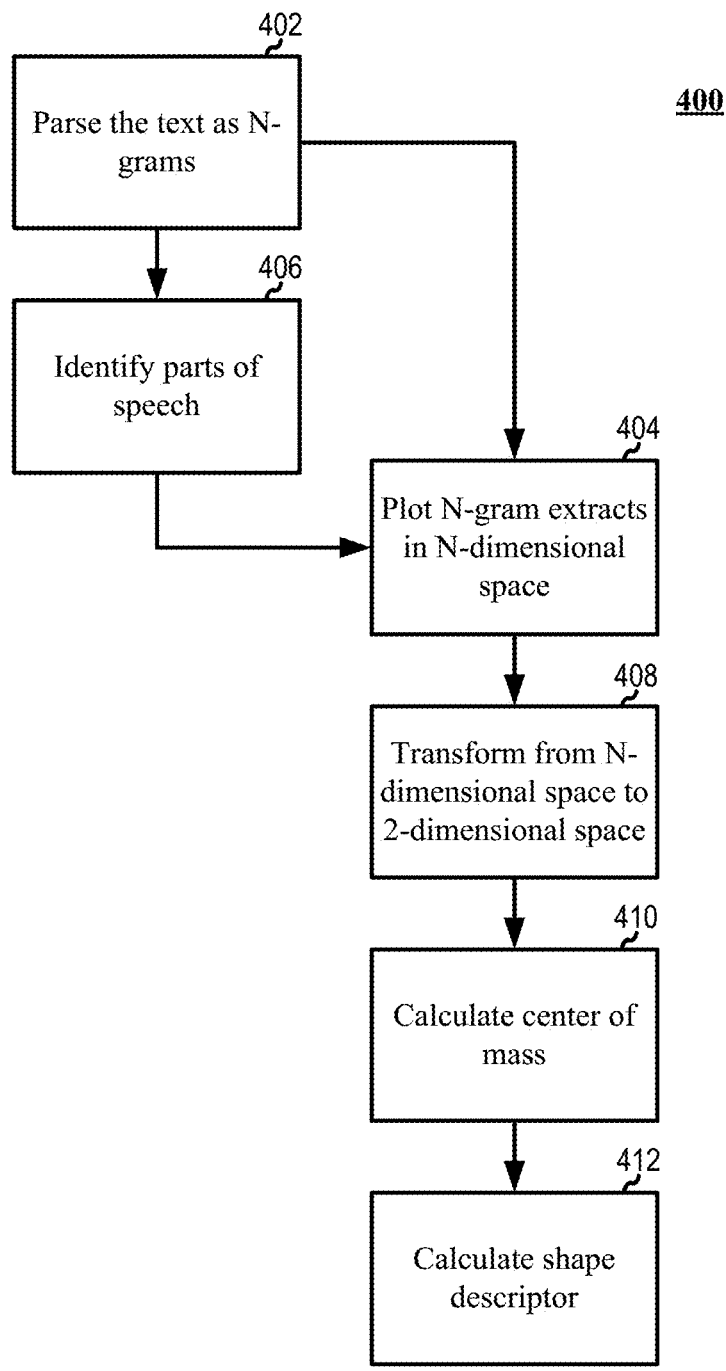
FIG. 4 illustrates a flow diagram of a method and system for detecting machine generated works according to one aspect of the present disclosure.

FIG. 4 is a flow diagram illustrating an exemplary routine 400 for determining whether the textual work is a machine generated or a non-machine generated work using, for example, one or more of the logical components of FIG. 3. In block 402, the text of the textual work is parsed as N-grams, for example, into N words, by the N-gram plotter 302. The parsed text, for example, the N words may then be plotted in N-dimensional space, illustrated as block 404, by the N-gram plotter 302. As mentioned above, the N-gram plotter 302 may utilize the results of the parts of speech tagger 304. The parts of speech tagger 304 may identify the words of the text, for example, the verbs, nouns, pronouns, adjectives, adverbs, prepositions, conjunctions, interjections, etc. in one or more sentences of the textual work, illustrates as block 404. The N-gram plotter 302 may use the types of words identified by the parts of speech tagger 304 as the N-grams and plot the N words in N-dimensional space, illustrated as block 404. In block 408, the N-dimensional space is transformed to 2-dimensional space. A center of mass of the 2-dimensional space plot is calculated, illustrated as block 410, and a shape descriptor of the 2-dimensional space plot is calculated, illustrated as block 412.

An example of an N-dimensional plot table is illustrated in FIG. 5. FIG. 5 illustrates an N-dimensional plot table 500 for the text "This is a sample text. It has different words. Words, different words." The various words of the text are identified in the first row 502, and the sentence the words are present in are identified in the first column 504. For example, the word "This" is present in the text one time (in the first sentence), thus, there is a "1", illustrated as 506, in the second row, second column of the table. As another example, the word "words" is present in the text three times (once in the second sentence and twice in the third sentence), thus, there is a "1", illustrated as 508, in the third row, tenth column of the table, and there is a "2", illustrated as 510, in the fourth row, tenth column of the table. It should be appreciated that the table 500 is merely illustrative and would be considerably larger if the text was a book, for example, including thousands words and sentences. Further, if only the verbs or nouns of the text were used, the words in the first row of the table would only include the verbs or nouns of the text. Each word column of the table 500 may be considered one of the "N" dimensions. Thus table 500 shows a nine dimensional table.

The N-dimensional plot is transformed into 2-dimensions. This is because different texts or textual works will have a different N-dimensional space, due to the number of words in the respective texts or works. To transform from the N-dimensional space to the 2-dimensional space, a center of mass of the N-dimensional plot is calculated, and the Euclidean distance and angle between points may be calculated, for example, using the Pythagorean formula. In one aspect, the center of mass of the N-dimensional plot is calculated using one or more clustering algorithms, for example, including, but not limited to, a K-Means algorithm and a K-Means++ algorithm.

An example of transforming the N-dimensional plot into 2-dimensions, using the N-dimensional plot table illustrated in FIG. 5, is described below:

As illustrated in FIG. 5, the N-dimensional points for Sentences 1-3 are:
S1: [1, 1, 1, 1, 1, 0, 0, 0, 0]
S2: [0, 0, 0, 0, 0, 1, 1, 1, 1]
S3: [0, 0, 0, 0, 0, 0, 0, 1, 2]

A TF-IDF (Term Frequency-Inverse Document Frequency) is calculated to give significant words a higher weight than non-significant words in the example calculation, and the results are as follows:
S1: [0.21972, 0.21972, 0.21972, 0.21972, 0.21972, 0.0, 0.0, 0.0, 0.0]
S2: [0.0, 0.0, 0.0, 0.0, 0.0, 0.27465, 0.27465, 0.0, 0.0]
S3: [0.0, 0.0, 0.0, 0.0, 0.0, 0.0, 0.0, 0.0, 0.0]

A center of mass based on the TF-IDF is calculated using the clustering algorithm KMeans++, and the results are as follows:
Center:[0.07324, 0.07324, 0.07324, 0.07324, 0.07324, 0.09155, 0.09155, 0.0, 0.0]

A 2-dimensional plot is calculated for each sentence. An example of calculating the 2-dimensional plot for S1 in an [x,y] plane is as follows:

$$x = \cos * d$$

$$y = \sqrt{(d^2 - (\cos^2 * d^2))}$$

in which:
cos=cosine similarity between the center and S1
d=Euclidean distance between the center and S1
Performing the 2-dimensional plot calculation for each of the sentences results in the following:
S1: [0.27629, 0.21842]
S2: [0.19001, 0.24035]
S3: [0.0, 0.20876]

Figure 6:
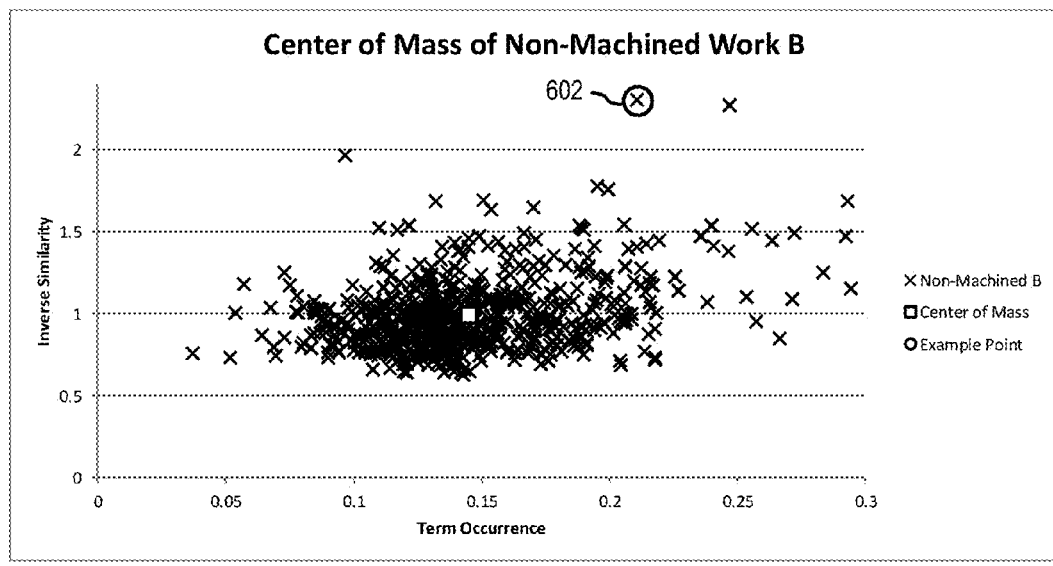
FIGS. 6 and 7 illustrate exemplary 2-dimensional plots of a non-machine generated work according to one aspect of the present disclosure.

The 2-dimensional space conversion or the generation of the 2-dimensional plot may create clusters of similar sentences. An example of a 2-dimensional plot of a non-machined work B is illustrated in FIG. 6. As illustrated in FIG. 6, the x-axis of the plot is the term occurrence, which corresponds to a value of a ratio of a distance from the center of mass of the N-dimensional plot to the specifically plotted point/sentence, and the y-axis is inverse similarity corresponding to a ratio of similarity or commonality of the point/sentence to the center of mass of the N-dimensional plot, in which a value of zero corresponds to a high similarity and a higher value, for example, two, corresponds to a lower similarity. As an example, a specific sentence, illustrated as an example point 602, may correspond to the number of times each word is present in the sentence. From the location of the example point 602, it can be determined that the point 602 is not very similar to the remaining sentences or is an uncommon sentence in the non-machined work B or compared to the center of mass of the N-dimensional plot.

Figure 7:
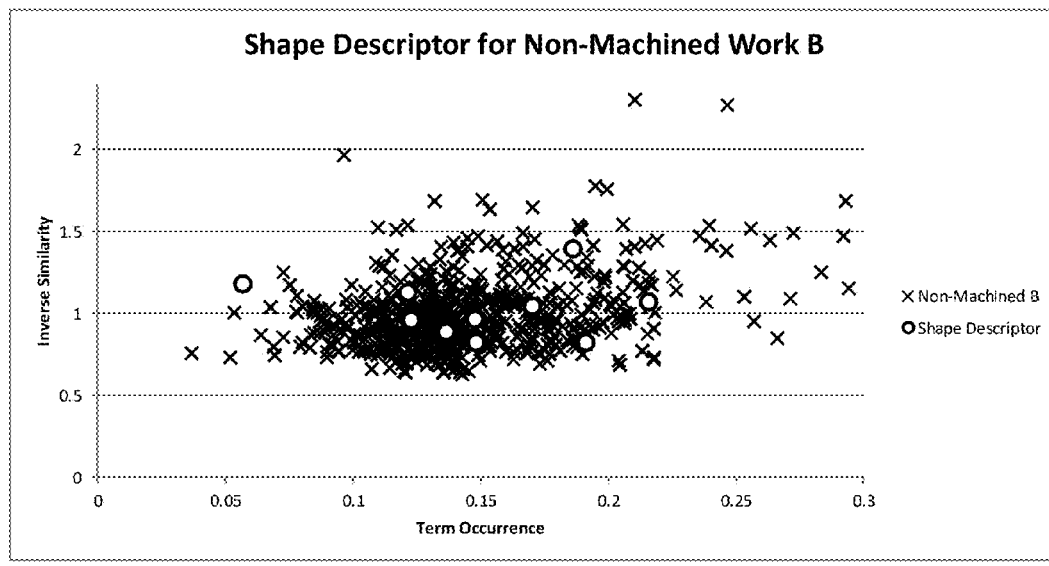

In order to determine whether the textual work is a machine generated or a non-machine generated work, the 2-dimensional plot of the textual work is compared to a 2-dimensional plot of other known works. To compare the works, the center of mass of the non-machine generated work B is calculated, as illustrated in FIG. 6. Additionally, a shape descriptor of the 2-dimensional plot of the non-machine generated work B is calculated, illustrated in FIG. 7. As illustrated in FIG. 7, the shape descriptor is one or more points defining a shape of the 2-dimensional plot of the non-machine generated work B. In an example, the shape descriptor may be a histogram. The center of mass and the shape descriptor of the non-machine generated work B may then be compared to center of masses and shape descriptors of other works.

An example of calculating the center of mass and the shape descriptor, based on the N-dimensional plot table illustrated in FIG. 5, includes using the clustering algorithm K-Means++. Using the K-Means++ algorithm, the 2-dimensional center of mass for the 2-dimensional plot of the data of FIG. 5, described above, results in a center of mass: [0.15543, 0.22251], and a shape descriptor using 3 sample points: [0.15604, 0.12092, 0.03891].

Figure 8:
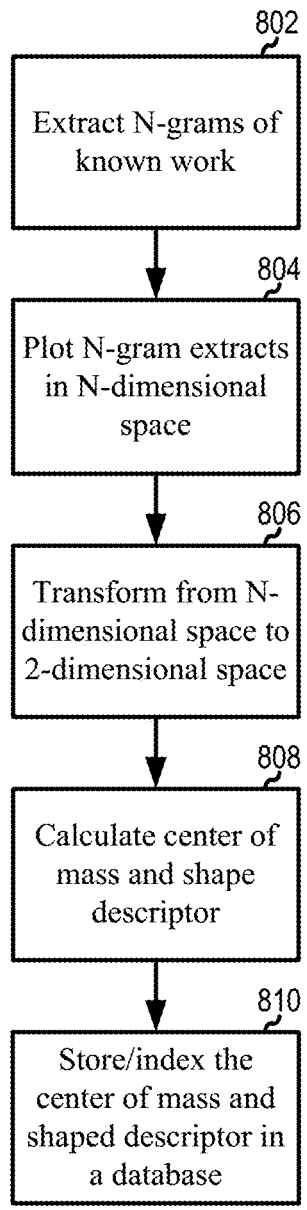
FIG. 8 illustrates a flow diagram of building an indexed database for detecting machine generated works according to one aspect of the present disclosure.

Aspects of the present disclosure may include analyzing samples of known machine and non-machine generated works and creating an indexed database of the works for comparison to unknown works. A flow diagram of creating the indexed database is illustrated in FIG. 8. The N-grams or words of the known work are extracted, illustrated as block 802, and the N-gram extracts are plotted in N-dimensional space, illustrated as block 804. The N-dimensional space is transformed to a 2-dimensional space, illustrated as block 806. The center of mass and the shape descriptor of the 2-dimensional space plot of the known work are calculated, illustrated as block 808. The center of mass and the shape descriptor are then indexed into a database, for example, the storage database 212 described above, in connection with the known work. This may be done for a number of works in order to build a robust database of known works for use in comparison to unknown works to determine whether the unknown work is a machine generated or a non-machine generated work.

Figure 9:
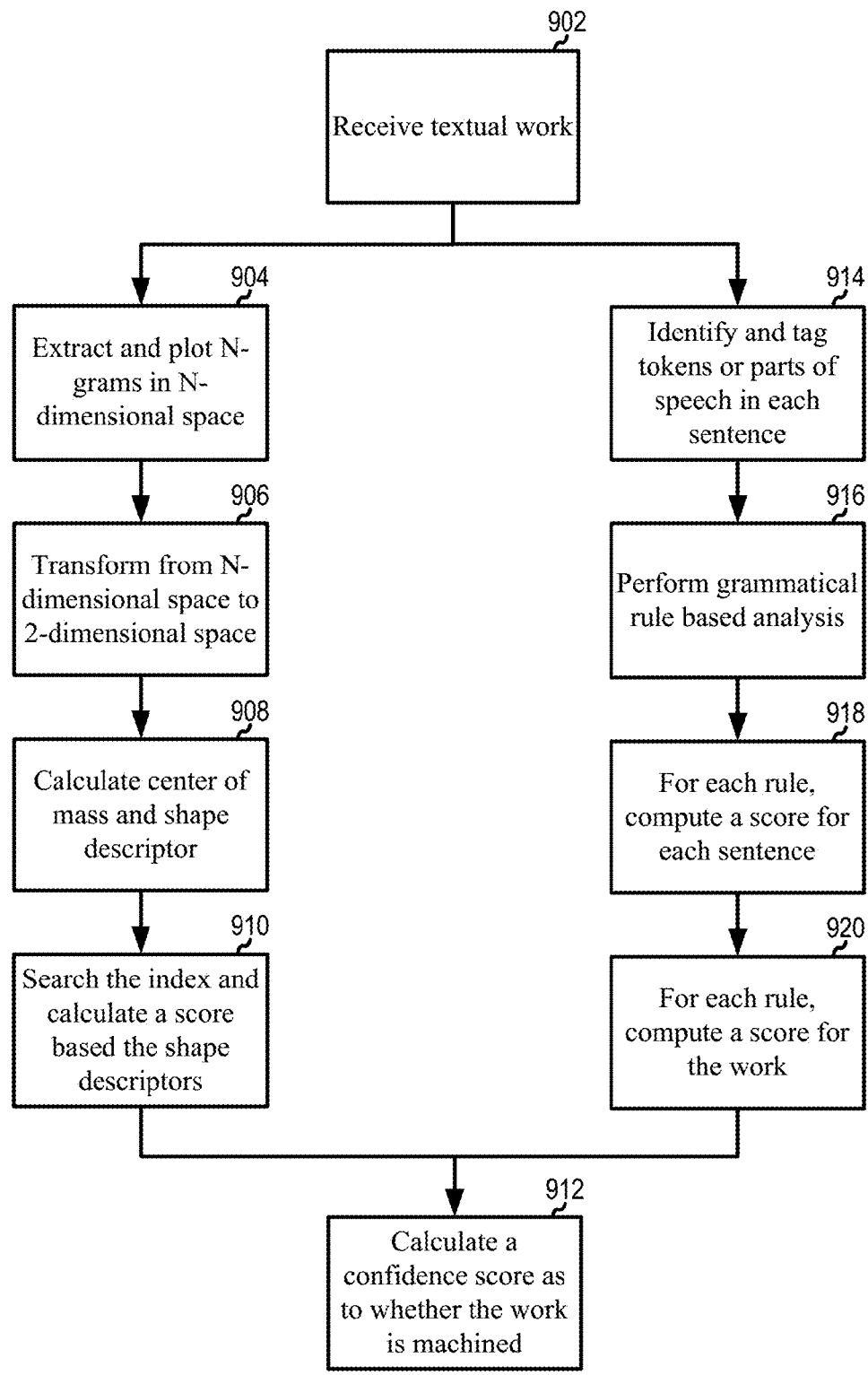
FIG. 9 illustrates a flow diagram of a method and system for detecting machine generated works according to one aspect of the present disclosure.

A flow diagram of a method of determining whether an unknown work is a machine generated or a non-machine generated work is illustrated in FIG. 9. An unknown textual work is received, for example, by the machine text detection system 300, illustrated as block 902. The words of the unknown textual work are extracted as N-grams in N-dimensional space and plotted, for example, by the N-gram plotter 302 described above, illustrated as block 904. The N-dimensional space is transformed to a 2-dimensional space, as described above, illustrated as block 906. A center of mass and a shape descriptor of the 2-dimensional space plot of the unknown work are calculated, illustrated as block 908. The center of mass is used to search the indexed database for one or more known works having a similar center of mass, and the shape descriptor is compared to the shape descriptor of the known works having a similar center of mass, for example, the five closest instances of the known works, and a score is calculated based on the similarity to the known works, illustrated as block 910. A confidence score corresponding to, for example, a percentage, that the unknown work matches the know work(s) is then calculated based on these scores to determine whether the unknown work is a non-machine generated work or a machine generated work, illustrated as block 912.

In addition or alternatively, after receiving the unknown work, the unknown work may be parsed to identify and tag tokens or words corresponding to various parts of speech in each sentence, for example, by the parts of speech tagger 304 described above, illustrated as block 914. The sentences may then be analyzed, for example, by the rule based detector 306 described above, according to various grammatical rules to identify, for example, improper verb clustering, improper verb tense, improper noun clustering, improper sentence endings, foreign word occurrences, and other grammatical errors and anomalies, illustrated as block 916. For each rule, a score may be computed for each sentence, illustrated as block 918.

For example, if a sentence includes three or more verbs next to each other, the improper verb clustering rule may identify the sentence as improper and assign a score corresponding to improper grammar. If a sentence includes one or more verbs having the wrong tense, the improper verb tense rule may identify the sentence as improper and assign a score corresponding to improper grammar. If a sentence includes three or more nouns next to each other, the improper noun clustering rule may identify the sentence as improper and assign a score corresponding to improper grammar. If a sentence does not have a grammatically correct ending, the improper sentence ending rule may identify the sentence as improper and assign a score corresponding to improper grammar. Similarly, if a sentence includes a foreign word (for example, a word not found in the language in which the sentence is written), the foreign word occurrence rule may identify the sentence as improper and assign a score corresponding to improper grammar. Other rules may also be configured and applied.

Further, for each rule, an overall score for each sentence may be computed, illustrated as block 920. These scores may then be used to calculate a confidence score corresponding to, for example, a percentage that the unknown work is grammatically correct to determine whether the unknown work is a non-machine generated work or a machine generated work, illustrated as block 912.

In another aspect, the scores resulting from the comparison and the scores resulting from the rules based analysis may be combined and used to calculate the confidence score to determine whether the unknown work is a non-machine generated work or a machine generated work, illustrated as block 912.

When the confidence score indicates that the unknown work is a machine generated work, the unknown work may be identified and rejected for publishing. Alternatively, when the confidence score indicates that the unknown work is a non-machine generated work, the unknown work may be approved for publishing. After the unknown work is approved or rejected, the unknown work may optionally be subjected to manual review to determine whether or not the unknown work should actually published.

Figure 10:
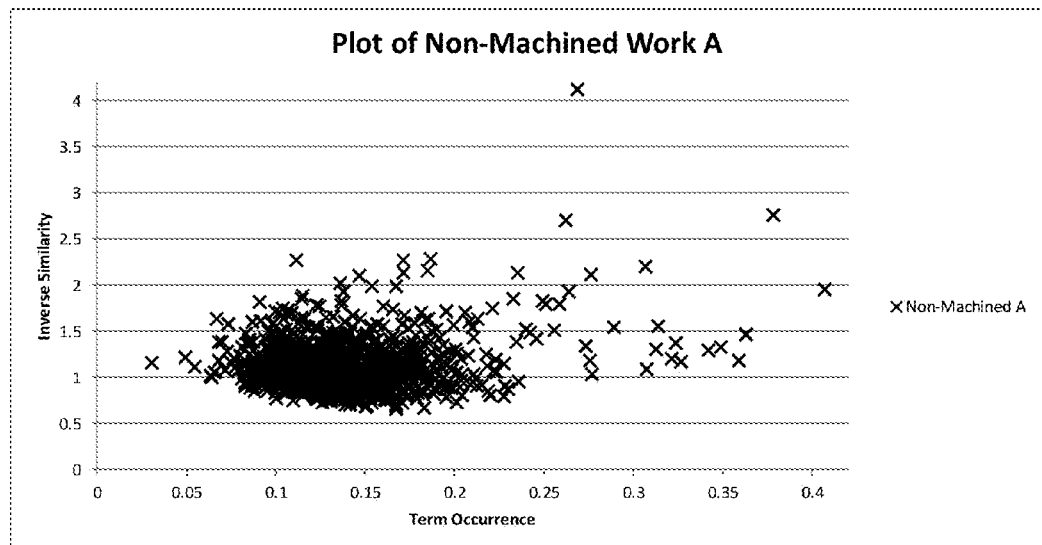
FIG. 10 illustrates an exemplary 2-dimensional plot of a non-machine generated work according to one aspect of the present disclosure.
Figure 11:
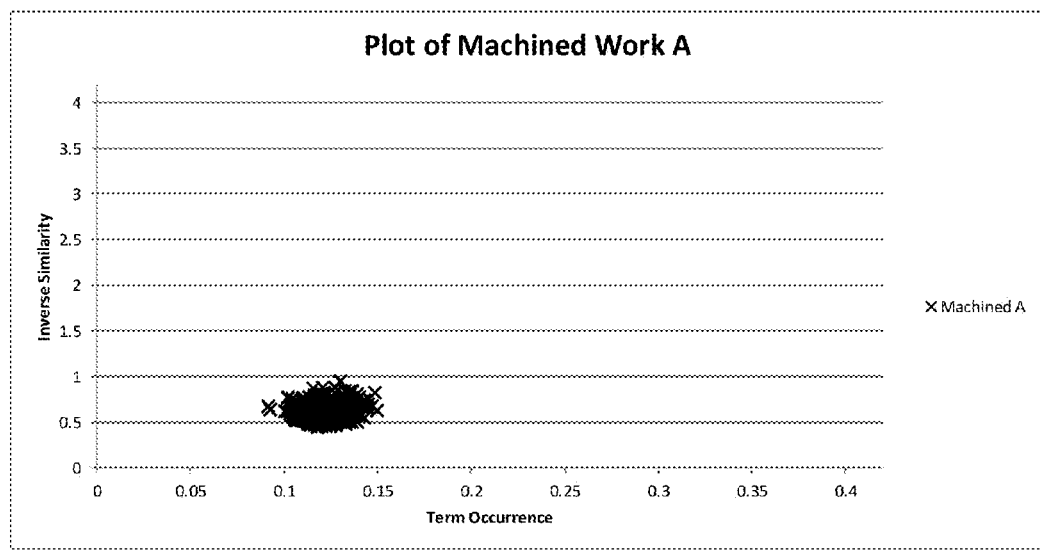
FIG. 11 illustrates an exemplary 2-dimensional plot of a machine generated work according to one aspect of the present disclosure.
Figure 12:
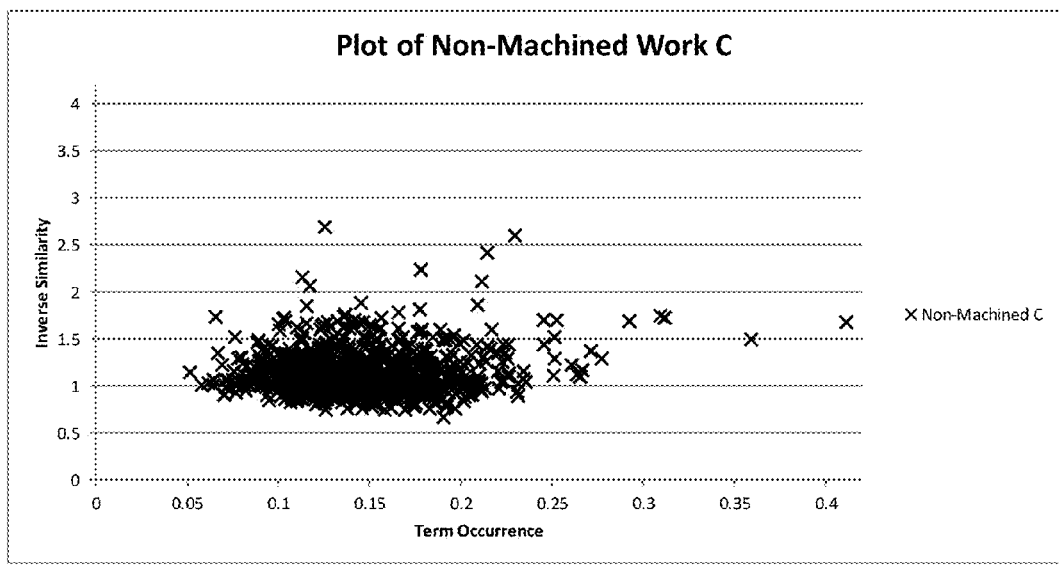
FIG. 12 illustrates an exemplary 2-dimensional plot of a non-machine generated work according to one aspect of the present disclosure.

Some example 2-dimensional plots of non-machined works and machine works are illustrated in FIGS. 10-14. By comparing these plots it can be seen that non-machine generated works and machine generated works produce different shapes and the non-machine generated works may be identified following the techniques described herein. As illustrated in FIGS. 10 and 12, a non-machine generated work A and a non-machine generated work C each have respective clusters of points indicating similarity between the sentences within the respective works and a respective number of scattered points around the respective clusters indicating a respective number of less similar sentences.

Figure 13:
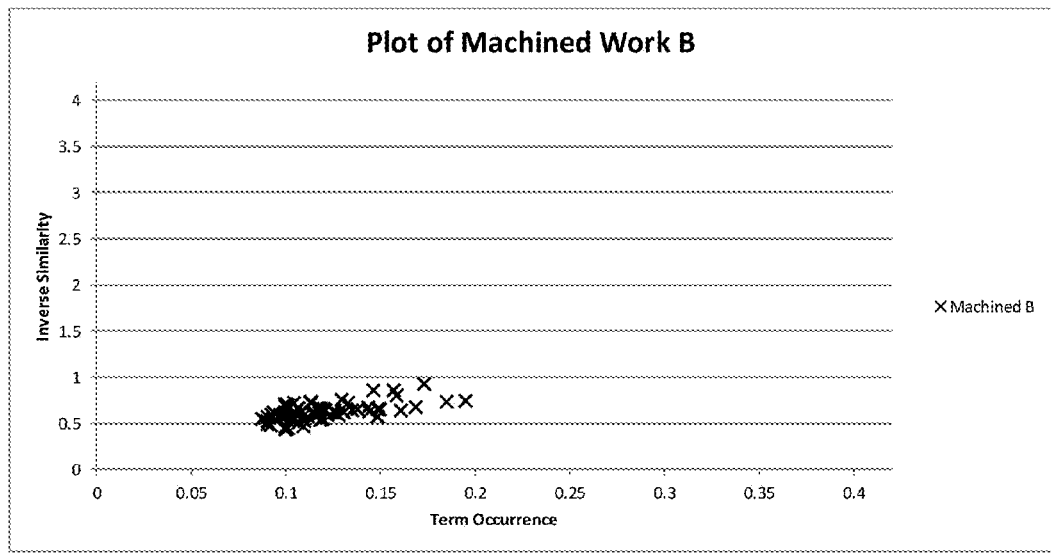
FIG. 13 illustrates an exemplary 2-dimensional plot of a machine generated work according to one aspect of the present disclosure.
Figure 14:
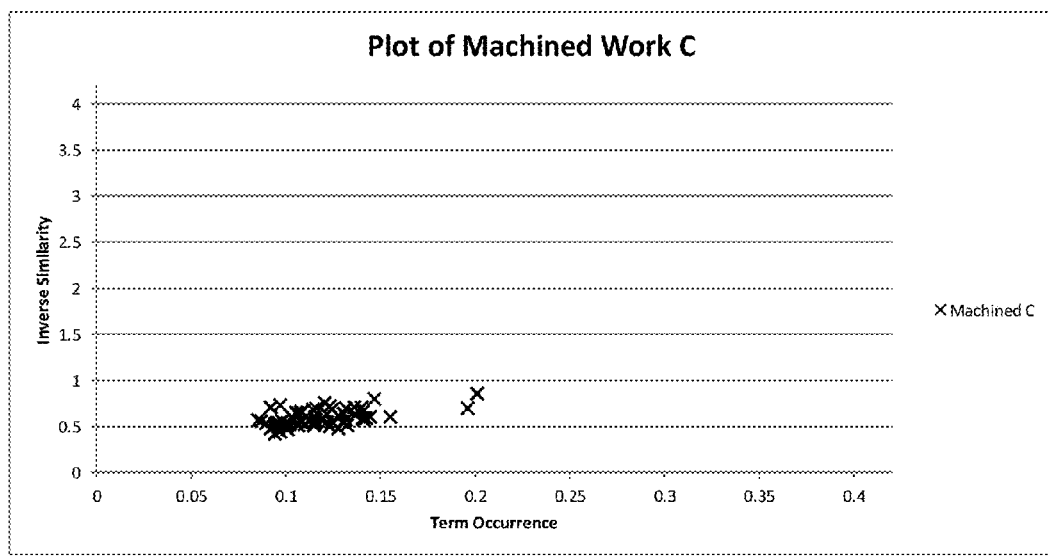
FIG. 14 illustrates an exemplary 2-dimensional plot of a machine generated work according to one aspect of the present disclosure.

In contrast, as illustrated in FIG. 11, a machine generated work A has a cluster of points, smaller than the clusters of points of the respective non-machine generated works A and C indicating a closer similarity between the sentences. Similarly, as illustrated in FIGS. 13 and 14, machine generated works B and C, representing machine generated compilations of website comments, have shapes that are substantially linear when compared to the shapes of the respective non-machine generated works A and C. Thus, by comparing the center of masses and the shape descriptors of various works it can be determined whether an unknown work is machine generated or non-machine generated.

As another example, it is expected that certain textual works, such as a phone book, would produce a 2-dimensional plot in which the points in the plot are spaced apart from one another. This is because commonality would likely be lacking between the sentences or entries in the phone book (i.e. each sentence or entry would include a different name, a different address, and a different phone number).

Aspects of the present disclosure may also be used to identify a relationship between the sentences within the textual work, a writing style of the author of the textual work, a grammatical structure of the sentences within the textual work, a quality of the textual work, and other aspects of the textual work. As described above, the 2-dimensional plot quantifies similarities between sentences within the textual work and illustrates a quantifies the writing style of the author in terms of a shape of the 2-dimensional plot. Therefore, the systems and methods disclosed herein may be used not only to determine whether a work is machine generated or non-machine generated, but also to quantify and even compare other aspects of textual works such as the relationships between the sentences within the textual work and the writing style of the author of the textual work.

It should be appreciated, that the generation of the N-gram and the N-gram, the plotting of the N-gram in the N-dimensional space and the resulting plot, the transforming of the N-dimensional plot or space to the 2-dimensional space and the resulting 2-dimensional plot, and the shape descriptor and the center of mass of the plot in the 2-dimensional space need not be displayed or prepared for display on a display interface or display device. These aspects may simply represent data that is generated/created and utilized by the system to perform the functions described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the detection techniques described herein may be applied to many different languages and types of textual works. Persons having ordinary skill in the field of computers, digital imaging, and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware.

Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
storing, in computer memory, a textual work;
generating an N-gram of N words of the textual work;
generating a 2-dimensional plot based, at least in part, on the N-gram;
storing, in computer memory, data corresponding to at least one 2-dimensional representation of at least one pre-determined machine generated work;
processing the 2-dimensional plot and the at least one 2-dimensional representation to obtain a score indicative of a correlation between characteristics of the textual work and characteristics of the at least one pre-determined machine generated work; and
determining, based at least in part on the score, that the textual work comprises at least a portion of machine generated grammatically unintelligible text.

2. The computer-implemented method of claim 1, further comprising:
storing pre-determined shape descriptors corresponding to the at least one pre-determined machine generated work;
comparing a shape descriptor of the 2-dimensional plot to the pre-determined shape descriptors;
calculating a center of mass and the shape descriptor of the 2-dimensional plot; and
determining further, based at least in part on the comparing, that the textual work is machine generated.

3. The computer-implemented method of claim 2, in which the comparing includes comparing the center of mass to pre-determined centers of the pre-determined machine generated works.

4. The computer-implemented method of claim 2, further comprising searching an index of a database of the pre-determined shape descriptors for a pre-determined shape descriptor having substantially a same shape as the shape descriptor of the textual work.

5. The computer-implemented method of claim 1, in which generating the N-gram includes identifying a number of times each of the N words appears in one or more sentences of the textual work.

6. The computer-implemented method of claim 1, further comprising:
parsing the textual work; and
identifying at least one of verbs, nouns, pronouns, adjectives, adverbs, prepositions, conjunctions, and interjections in each sentence of the textual work.

7. The computer-implemented method of claim 6, further comprising:
applying one or more grammatical rules to each sentence of the textual work; and
computing a score for the textual work based on the application of the one or more grammatical rules.

8. A computing device, comprising:
at least one processor;
a memory device including instructions operable to be executed by the at least one processor to perform a set of actions, configuring the at least one processor:
to receive a textual work;
store, in computer memory, the textual work;
to generate an N-gram of N words of the textual work;
to generate a 2-dimensional plot based, at least in part, on the N-gram in the N-dimensional space;
to store, in computer memory, data corresponding to at least one 2-dimensional representation of at least one pre-determined machine generated work;
to process the 2-dimensional plot and the at least one 2-dimensional representation to obtain a score indicative of a correlation between characteristics of the textual work and characteristics of the at least one pre-determined machine generated work; and
to determine, based at least in part on the score, that the textual work comprises at least a portion of machine generated grammatically unintelligible text.

9. The computing device of claim 8, further comprising configuring the at least one processor to:
store pre-determined shape descriptors corresponding to the at least one pre-determined machine generated work;
compare a shape descriptor of the 2-dimensional plot to the pre-determined shape descriptors;
calculate a center of mass and the shape descriptor of the 2-dimensional plot; and
determine further, based at least in part on the comparing, that the textual work is machine generated.

10. The computing device of claim 9, in which the processor is configured to compare the center of mass to pre-determined centers of the pre-determined machine generated works.

11. The computing device of claim 9, further comprising configuring the at least one processor to search an index of a database of the pre-determined shape descriptors for a pre-determined shape descriptor having substantially a same shape as the shape descriptor of the textual work.

12. The computing device of claim 8, further comprising configuring the at least one processor to generate the N-gram by identifying a number of times each of the N words appears in one or more sentences of the textual work.

13. The computing device of claim 8, further comprising configuring the at least one processor to:
parse the textual work; and
identify at least one of verbs, nouns, pronouns, adjectives, adverbs, prepositions, conjunctions, and interjections in each sentence of the textual work.

14. The computing device of claim 13, further comprising configuring the at least one processor to:
apply one or more grammatical rules to each sentence of the textual work; and
compute a score for the textual work based on the application of the one or more grammatical rules.

15. A computer-implemented method of identifying machine generated text, comprising:
receiving a textual work;
storing, in computer memory, the textual work;
parsing a portion of the textual work and identifying at least one of verbs, nouns, pronouns, adjectives, adverbs, prepositions, conjunctions, and interjections in each sentence of the portion;
representing, in the computer memory, the parsed portion of the textual work as a 2-dimensional representation of the identified at least one of verbs, nouns, pronouns, adjectives, adverbs, prepositions, conjunctions, and interjections;
applying one or more grammatical rules to the 2-dimensional representation;
calculating a confidence score corresponding to the application of the one or more grammatical rules; and
determining, based at least in part on the confidence score, that the textual work comprises at least a portion of machine generated grammatically unintelligible text.

16. The computer-implemented method of claim 15, in which the calculating of the confidence score includes assigning a score relating to grammatical correctness for each sentence of the portion based on application of the one or more grammatical rules.

17. The computer-implemented method of claim 16, in which the calculating includes computing an overall score for the portion based one or more sentence scores, wherein the overall score is a combination of the score for each of the sentences.

18. The computer-implemented method of claim 15, in which the applying of the one or more grammatical rules includes applying one or more of an improper verb clustering rule, an improper verb tense rule, and improper noun clustering rule, an improper sentence ending rule, and a foreign word occurrence rule.

* * * * *